United States Patent
Lax et al.

(10) Patent No.: US 10,935,984 B2
(45) Date of Patent: Mar. 2, 2021

(54) METHOD AND SYSTEM FOR DETERMINING A CLIMB PROFILE

(71) Applicant: GE AVIATION SYSTEMS LLC, Grand Rapids, MI (US)

(72) Inventors: David Michael Lax, Cascade Township, MI (US); Reza Ghaemi, Watervliet, NY (US); Pierino Gianni Bonanni, Loudonville, NY (US); Nicholas Race Visser, Grand Rapids, MI (US); Owen Michael O'Keefe, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 212 days.

(21) Appl. No.: 16/037,234

(22) Filed: Jul. 17, 2018

(65) Prior Publication Data
US 2020/0026307 A1    Jan. 23, 2020

(51) Int. Cl.
G05D 1/04    (2006.01)
G08G 5/00    (2006.01)

(52) U.S. Cl.
CPC ........... *G05D 1/042* (2013.01); *G08G 5/0039* (2013.01); *G08G 5/0047* (2013.01)

(58) Field of Classification Search
CPC ..... G05D 1/042; G08G 5/0039; G08G 5/0047
USPC .................................................. 701/4, 5, 18
See application file for complete search history.

(56) References Cited

U.S. PATENT DOCUMENTS

| | | | |
|---|---|---|---|
| 6,148,259 A | 11/2000 | Hagelauer | |
| 6,266,610 B1 | 7/2001 | Schultz | |
| 8,645,009 B2 * | 2/2014 | Klooster | G05D 1/0607 701/4 |
| 9,177,480 B2 | 11/2015 | Subbu | |
| 9,564,056 B1 | 2/2017 | Ghaemi | |
| 9,728,091 B2 | 8/2017 | Shay | |
| 2007/0208465 A1 * | 9/2007 | Gremmert | G05D 1/0607 701/4 |
| 2013/0221164 A1 | 8/2013 | Klooster | |
| 2014/0012436 A1 * | 1/2014 | Coulmeau | G05D 1/0607 701/3 |
| 2017/0249849 A1 | 8/2017 | De Prins | |

(Continued)

FOREIGN PATENT DOCUMENTS

WO        16009412 A1      1/2016

OTHER PUBLICATIONS

David Lax et al; GE Aviation Systems LLC; Title: "Quantifying Operating Cost Reduction From Aircraft Performance Optimization", Apr. 10-12, 2018, 12 pages, U.S.

(Continued)

*Primary Examiner* — Isaac G Smith
(74) *Attorney, Agent, or Firm* — McGarry Bair PC

(57) ABSTRACT

A method and system of determining or predicting a climb profile for an aircraft, includes receiving, by a controller module, an initial climb profile defining a portion of a flight plan for the aircraft between takeoff and a cruise profile, and an altitude climb constraint defining at least one altitude limitation of the aircraft, determining, by the controller module, that the initial climb profile does not satisfy the altitude constraint, and determining an updated climb profile based on a set of subsequent climb models.

20 Claims, 7 Drawing Sheets

(56) References Cited

U.S. PATENT DOCUMENTS

2018/0067500 A1\* 3/2018 Kim .................... G08G 5/0052
2019/0121369 A1\* 4/2019 DiRusso .......... G06Q 10/06315

OTHER PUBLICATIONS

European Patent Office, European Search Report re Application No. 19174742.7-1204, dated Dec. 11, 2019, 7 pages, Munich, Germany.

\* cited by examiner

METHOD AND SYSTEM FOR DETERMINING A CLIMB PROFILE

STATEMENT REGARDING FEDERALLY SPONSORED RESEARCH OR DEVELOPMENT

This disclosure was made with government support under Contract No. DTFAWA-15-A-80013 awarded by the United States Federal Aviation Administration. The Government has certain rights in this disclosure.

BACKGROUND

A flight management system (FMS) is a computer-based system on-board an aircraft that performs a number of in-flight tasks, including in-flight management of a flight plan. FMSs have been in use for many years, and the programming techniques used by FMSs heretofore are designed for the computing capabilities of prior generations of computerized systems. For example, prior FMSs still in service today typically make assumptions regarding many of the complex and varied parameters regarding a flight path, including but not limited to fixed (i.e., constant) values for aspects regarding the aircraft and its performance characteristics and a constant value for aircraft operations during a climb portion of flight.

BRIEF DESCRIPTION

In one aspect, the present disclosure relates to a method of determining a climb profile for an aircraft, the method including receiving, by a controller module, an initial climb profile defining a portion of a flight plan for the aircraft between takeoff and a cruise profile, and an altitude climb constraint defining at least one altitude limitation of the aircraft, determining, by the controller module, that the initial climb profile does not satisfy the altitude climb constraint, selecting, by the controller module, a deviation point of the initial climb profile prior to the altitude climb constraint, repeatedly calculating, by the controller module, a set of subsequent climb models starting from the deviation point based on successive aircraft energy levels, determining an updated climb profile based on the set of subsequent climb models, determining the updated climb profile satisfies the altitude climb constraint, and operating the aircraft in accordance with the updated climb profile.

In another aspect, the present disclosure relates to A system for determining a climb profile, the system including memory storing an initial climb profile defining a portion of a flight plan between takeoff and a cruise phase, and an altitude climb constraint defining at least one altitude limitation of the aircraft, and a controller module configured to receive the initial climb profile and the altitude climb constraint, to determining that the initial climb profile does not satisfy the altitude climb constraint, to select a deviation point of the initial climb profile prior to the altitude climb constraint, to repeatedly calculate a set of subsequent climb models starting from the deviation point based on successive aircraft energy levels, to determine an updated climb profile based on the set of subsequent climb models, to determine the updated climb profile satisfies the altitude climb constraint, and to operate the aircraft in accordance with the updated climb profile.

In yet another aspect, the present disclosure relates to a method of predicting a climb profile for an aircraft, the method including receiving, by a controller module, an initial climb profile defining a portion of a flight plan for the aircraft between a first altitude and a second altitude, and an altitude climb constraint defining at least one altitude limitation of the aircraft, predicting, by the controller module, that the initial climb profile does not satisfy the altitude climb constraint, selecting, by the controller module, a deviation point of the initial climb profile prior to the altitude climb constraint, repeatedly calculating, by the controller module, a set of subsequent climb models starting from the deviation point based on successive aircraft energy levels, determining an updated climb profile based on the set of subsequent climb models, determining the updated climb profile satisfies the altitude climb constraint, and operating the aircraft in accordance with the updated climb profile.

DETAILED DESCRIPTION

Figure 1:
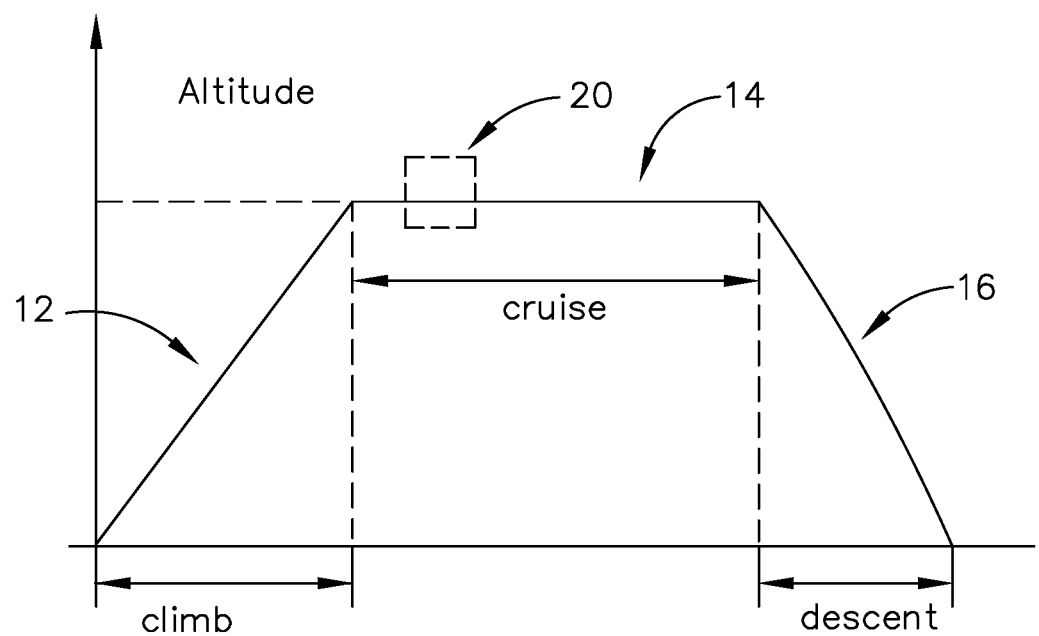
FIG. 1 illustrates a flight profile of an aircraft, in accordance with various aspects described herein.

Aspects of the disclosure can be implemented in any environment, apparatus, or method for determining or estimating a climb profile with a system regardless of the function performed by the ascending device. For example, a climb profile can be utilized by air-based vehicles, such as aircraft vehicles (e.g. fixed wing or rotor-based, such as a helicopter), or water-based vehicles, such as submergible vehicles.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g. upper, lower, upward, downward, higher, lower, back, forward, above, below, vertical, horizontal, etc.) are only used for identification purposes to aid the reader's understanding of the disclosure, and do not create limitations, particularly as to the position, orientation, relative position of, or use thereof, unless otherwise stated. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. The exemplary drawings are for purposes of illustration only and the dimensions, positions, order and relative sizes reflected in the drawings attached hereto can vary.

As used herein, a "system" can include a "controller module" having at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

In non-limiting examples, systems, controller modules, and the like can receive data or information. This receiving can include data transmissions, data supply, or any other providing of the information in a previous calculation, event, etc. In further non-limiting examples, a system or controller module can receive data or information from a previous task or determination completed by the same system or controller module, or another system or controller module.

The present disclosure relates to determining guidance instructions, such as a flight profile, that can include non-linear programming. As used herein, the term "nonlinear programming" is the process of solving an optimization problem defined by a system of equalities and inequalities, collectively termed "constraints," over a set of unknown real variables, along with an objective function to be maximized or minimized, where some of the constraints or the objective function are nonlinear. It is the sub-field of mathematical optimization that deals with problems that are not linear. The flight profile can further include a subset of profiles, such as an ascent or climb profile, a cruise profile, or a descent profile. The flight profile can include, or define, a flight path determined, estimated, or predicted by applying the determined control to the equations of motion given assumed initial operating states and environment conditions. In some aspects, the present disclosure particularly relates to a system and process to reduce costs parameters for a climb phase or portion of a flight path using determinations, computations, calculations, estimations, predictions, or nonlinear programming. As used herein the term "determining" refers to a determination of the system or method of an outcome or result that has occurred or is occurring (e.g. a "current" or "present" outcome or result), and contrasts with the term "prediction," which refers to a forward-looking determination or estimation that makes the outcome or result known in advance of actual performance of the occurrence.

In some aspects, nonlinear programming techniques may be leveraged to more accurately and efficiently define a flight path climb profile and generate an optimal control trajectory. In some aspects, nonlinear programming may be used to solve a guidance optimization problem (e.g., minimizing fuel consumption, reducing flight time, satisfying scheduling constraints, etc.) that is defined by a system of constraints over a set of unknown real variables. The use of nonlinear programming techniques and current computing capabilities in combination can provide a mechanism to address and generate a solution for the complicated nonlinear problem(s) of guidance optimization. As used herein, the term aircraft, airplane, or plane may include commercial aircraft as addressed in Title 14 of the Code of Federal Regulations part 25 (14 CFR part 25) containing rules for Airworthiness Standards: Transport Category Airplanes, drones, and other aerial vehicles.

Referring to FIG. 1, illustrated in graph format is a flight profile 10, such as a flight path for an aircraft (shown schematically as dotted box 20 flying along the flight profile 10). As shown, the flight profile 10 generally includes three phases or portions, including a climb profile 12 or ascent profile, a cruise profile 14, and a descent profile 16. The graph in FIG. 1 shows the general relationship between the altitude (vertical axis) and the range of an aircraft 20 (horizontal axis). Aspects of the disclosure can include determining, estimating, or predicting an efficient climb profile 12 when the climb profile or ascending portion of the flight is limited by one or more altitude-based constraints. As used herein, an "efficient" climb profile 12 can include, but is not limited to, a climb profile 12 and that reduces or minimizes a cost value of the climb profile 12, such as fuel consumption, ascent time, rescheduling costs, or the like. Additional "costs" can be included when determining the efficient climb profile 12, or the efficiency of the climb profile 12.

Figure 2:
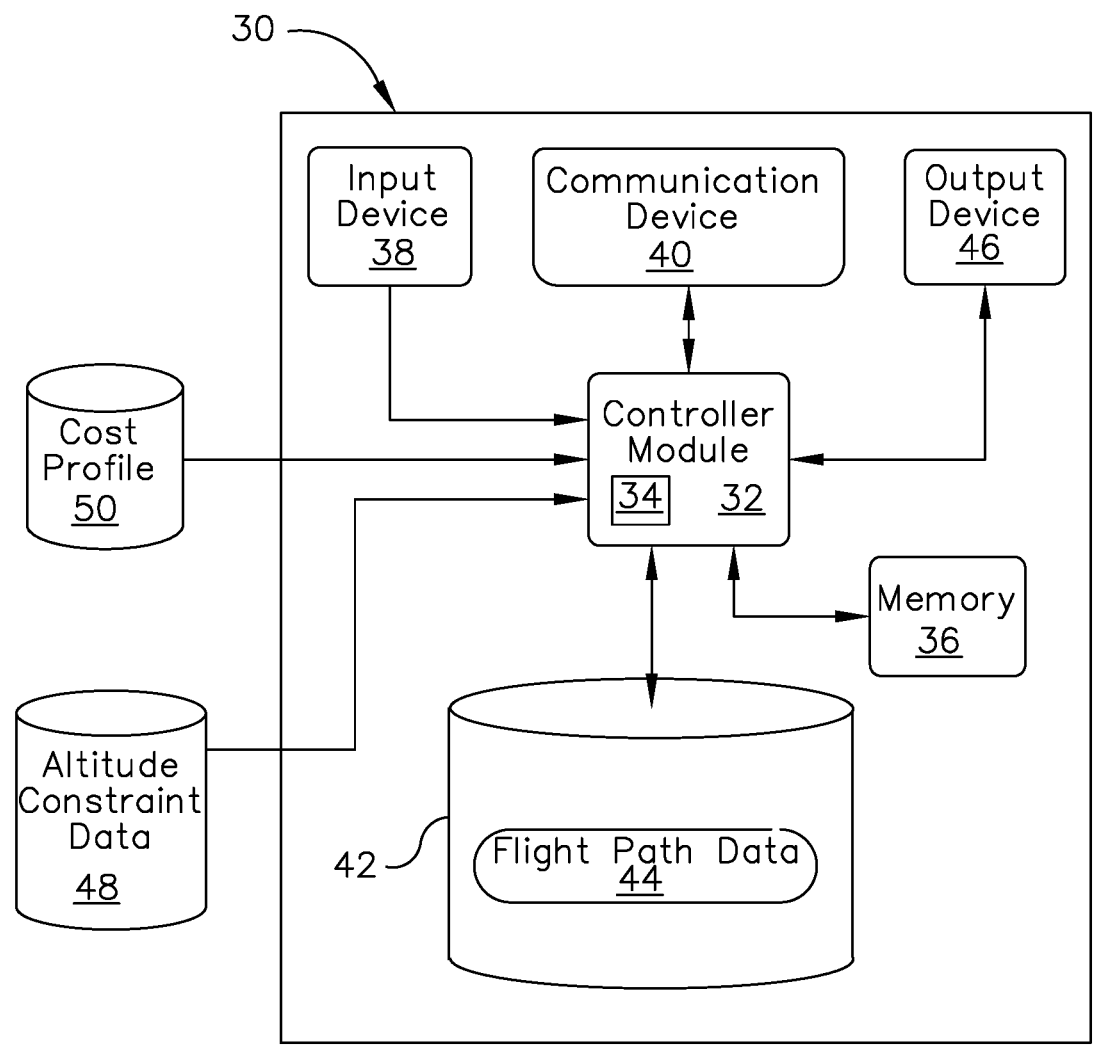
FIG. 2 illustrates a schematic view of an aircraft system for operating a flight profile such as in FIG. 1, in accordance with various aspects described herein.

FIG. 2 illustrates a system 30 for determining the climb profile 12 of FIG. 1 including determining the climb profile 12 while the aircraft is flying along the flight profile 10. As shown, the system 30 can include a controller module 32 having a processor 34 and communicatively connected with memory 36. Non-limiting aspects of the system 30 can further include a set of input devices 38, a communication device, a set of output devices 46, and a flight profile database 42 having or storing flight path data 44. Non-limiting examples of the flight path data 44 can include calculated profile data for the flight profile 10, or portions thereof. In another non-limiting example, the flight profile database 42 or flight path data 44 can include a set of flight path data 44, such as previously determined data or flight profiles 10, or temporarily computed data or flight profiles 10. In this instance, present or temporary flight path data 44 can be compared with previously determined flight path data 44. In another non-limiting aspect of the disclosure, the flight path data 44 can include parametric data related to the flight path or flight profile, or a subportion thereof. For instance, the flight path data 44 can include waypoint data, approach data, or a respective set of performance characteristic "point" data, wherein a set of "points" can define a determined, estimated, or predicted position, airspeed, altitude, heading, lift, drag, thrust, or additional data based on characteristics such as altitude or weight, or the like, for a series or sequence of points along the flight path. In another non-limiting example, the set of performance characteristic "point" data can further define additional characteristics of the aircraft 20, including but not limited to deterioration parameters (e.g. reflecting aircraft performance characteristic changes related to the age of the aircraft, or components thereof), or personalization parameters (e.g. reflecting different configurations or components of a particular aircraft 20, such as engines, within a fleet of aircraft). In this sense, the flight path data 44 or flight profile can include a series or sequence of individual or discrete "points" or "models."

In one example, the set of input devices 38 can be adapted to provide or supply aircraft data to the controller module 32 and can include, but are not limited to, sensors, detectors, additional systems, or the like. The aircraft data can be adapted or related to aspects of the aircraft 20, present or predicted flight, and utilized for establishing, determining, estimating, or predicting aspects related to the flight path data 44. In this sense, the aircraft data can be utilized to inform or update current, estimated, or future flight path data 44.

In another example, the set of output devices 46 can be adapted to receive data or communications of the system 30, such as a flight management system (FMS), an autopilot system, an autoflight system, an autoland system, or the like. In yet another non-limiting example, aspects of the system 30 can be included as a portion of the FMS, or another aircraft 20 or avionics system. In only non-limiting example, the system 30 can provide aspects of the flight profile database 42 or flight path data 44 to another receiving device. Non-limiting aspects of the communication device 40 can include any systems, transmitters, receivers, signal generators, or other mechanisms configured to enable communication between the system 30 and another device or system. For example, the communication device 40 can be adapted for transmission and receiving communications with ground-based systems, airport command and control systems, weather systems, or satellite-based systems, other aircraft, or the like. In this sense, the system 30 can utilize the communication device 40 to receive additional aircraft data or communications adapted or related to aspects of the aircraft's 20 present or predicted flight path data 44, or can communicate aspects of the flight path data 44 to another device, system, or the like. Thus, the communication device 40 can act or perform as an input device (similar to the set of input devices 38), and output device (similar to the set of output devices 46), or a combination thereof. As used herein, the communication device 40 can be adapted to handle digital or data transmissions (e.g. uploads or downloads) as well as analog or non-data transmissions (e.g. voice radio, etc.).

Additional non-limiting aspects of the system 30 can be included wherein at least one of the system 30 or the controller module 32 is communicatively connected with a database of altitude constraint data 48, such as altitude climb constraint data, and a database of cost profile data 50. As used herein, "altitude constraint data" 48 can include data related to the altitude constraints imposed, required, requested, or suggested during a climb profile 12 of the aircraft 20. In one non-limiting example, altitude constraint data 48 can include waypoints relative to the departure location, such as an airport, and can include restrictions relative to an altitude value or values at a particular location. Particular locations can include a specific limited area (e.g. limited by vectors or radial areas in specific facing directions, or geographic boundaries), or a general space defined by a radial or horizontal distance from the departure location. In one non-limiting example, the altitude constraint data 48 can be predefined by way of a set of standard waypoint data, and stored, kept, or maintained by an accessible database, the respective departure location, or the like.

Additionally, altitude constraint data 48 can define different thresholds or limits, such as altitude thresholds or altitude limits at each respective constraint. For instance, a first constraint can limit a maximum altitude at a waypoint (e.g. the aircraft 20 must pass the waypoint at an altitude "at-or-below" the constraint), a minimum altitude at a waypoint (e.g. the aircraft 20 must pass the waypoint at an altitude "at-or-above" the constraint), or a windowed altitude at a waypoint (e.g. the aircraft 20 must pass the waypoint at an altitude "at-or-between" a minimum and maximum constraints). An aircraft 20 passing the respective altitude constraint defined by the altitude constraint data 48 in accordance with the constraint (e.g. passing at an altitude at-or-below, at-or-above, or at-or-between, respectively) will be understood to "satisfy" the altitude constraint.

The cost profile data 50 can include data or values associated with operating, flying, maintaining, or otherwise utilizing the aircraft 20. The cost profile data 50 can be adapted to supply or provide cost or value data to the controller module 32. For example, the cost profile data 50 can include data related to fuel costs or value, fuel burn rates based on thrust, values associated with scheduling (e.g. passenger scheduling costs, or crew scheduling costs), and the like. In one non-limiting example, the cost profiled data 50 can be determined, calculated, updated, or predicted based on, for example, the set of performance characteristic data, weather system or weather data, of the flight path data 44.

While the altitude constraint data 48 and the cost profile data 50 are shown remote from the system 30, non-limiting aspects of the system 30 can be included wherein, for example, the altitude constraint data 48 and the cost profile data 50 are included in the system 30. For instance, at least a portion of the altitude constraint data 48 or the cost profile data 50 can be duplicated, copied, or stored in the memory 36 of the system 30. In another instance, at least a portion of the altitude constraint data 48 or the cost profile data 50 can be received by the system 30 or memory 36 by way of a transmission provided to the communication device 40. Additionally, while the set of input devices 38, communication device 40, and the set of output devices 46 are illustrated as a portion of the system 30, non-limiting aspects of the disclosure can be included wherein the set of input devices 38, communication device 40, the set of output devices 46, or a subset thereof, are located remotely from the system 30 and communicatively connected with the system 30.

Figure 3:
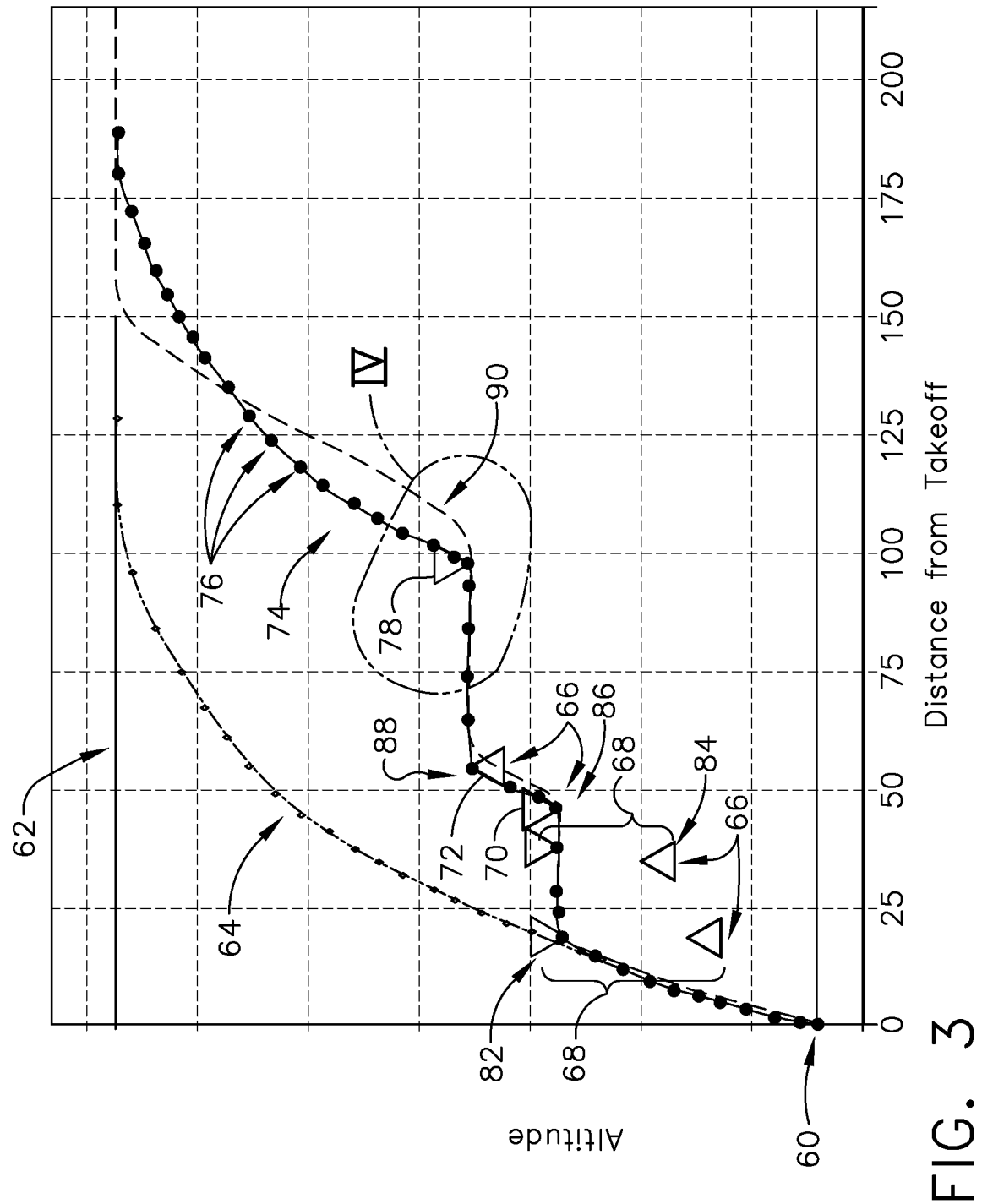
FIG. 3 illustrates a climb profile of the flight profile of FIG. 1, in accordance with various aspects described herein.

FIG. 3 illustrates an exemplary plot graph that can form the climb profile 12 of FIG. 1 and a set of altitude constraints 66 affecting the climb profile 12. FIG. 3 includes a limited portion of the beginning of the cruise profile 14, for understanding of the initial climb. The climb profile 12 can include an initial climb trajectory 64 of an aircraft 20 ascending from a departure location, such as an airport, located at point 60. In one non-limiting example, the climb profile 12 can include additional information related to the ascent or climb of the aircraft 20 and not captured by the climb trajectory 64. For example, aspects of the climb profile 12 can include cost analysis, weather interactions, timing considerations, or the like, while the climb trajectory 64 can be limited to, for instance, airspeed, heading, throttle controls, or aircraft-specific characteristics. The initial climb trajectory 64 can include at least a portion of the flight plan for the aircraft between takeoff from the airport at 60 and a cruise altitude 62 or cruise portion of the flight plan. In the illustrated example, the initial climb trajectory 64 can be determined, predicted, or calculated based on an optimal ascent without regard to the set of altitude constraints 66.

The set of altitude constraints 66 are represented as triangular indicators spaced relative to a distance from the airport 60. The set of altitude constraints 66 include a set of windowed altitude constraints 68 (i.e. an altitude range defined between respective minimum and maximum constraints), maximum altitude constraints 70 (i.e. at-or-below constraint), and minimum altitude constraints 72 (i.e. at-or-above constraint). As schematically represented, the set of altitude constraints 66 can define a representative "limit" of the respective constraint(s) 66, such as defined by a upper or lower tip or apex of the illustrated triangle. From the illustration, the initial climb trajectory 64 will not satisfy the set of altitude constraints 66 since it climbs to an altitude above at least a first maximum altitude constraint 82. Thus, an updated climb profile or updated climb trajectory departing from the unconstrained optimal ascent is needed.

An updated climb trajectory 74 for the climb profile 12 is illustrated comprising a subset of discrete points or "models" 76 along the updated climb trajectory 74. The set of models 76 can include respective performance characteristics of the aircraft 20 at respective points in the updated climb profile 12 or the updated climb trajectory 74. While discrete points are described, the set of models 76 can include a continuous trajectory 74 or range, and are not limited to specific and separated "points." In this sense, the updated climb trajectory 74 can be a continuous, contiguous, or uninterrupted trajectory 74 comprising one or more models 76.

Aspects of the disclosure can be included wherein the system 30 described with respect to FIG. 3 can be configured to determine, generate, calculate, or otherwise define the updated climb profile 12 or the updated climb trajectory 74. Defining the updated climb profile 12 or the updated climb trajectory 74 can occur during a flight, prior to initiating the climb profile 12 of the aircraft 20, or during a climb profile 12 (e.g. re-determining or re-generating the updated climb profile 12 or climb trajectory 74 based on the upcoming set of altitude constraints 66). In another non-limiting example, aspects of the system 30 can estimate or predict a future climb profile 12 or updated climb trajectory 74 prior to a flight occurring, or well in advance of the operating the aircraft 20 (e.g. hours, days, weeks, etc.). In another non-limiting example, the system 30 can be configured to share or distribute the determining, generating, calculating, or otherwise defining the climb profile 12 or the updated climb trajectory 74 between disparate or remotely located systems (e.g. shared between a ground-based computer and the FMS of a flying aircraft 20).

The system 30 can operably determine, predict, or estimate the updated climb profile 12 or the updated climb trajectory 74 by starting with the closet, most proximate, or first altitude constraint 66 that the aircraft 20 will reach. In the illustrated example, the first altitude constraint 82 is a windowed altitude constraint 68. As shown, the initial climb trajectory 64 would not satisfy the first altitude constraint 82 as the altitude would exceed the maximum altitude allowable. Thus, the system 30 or the controller module 32 can determine, for example, based on aircraft data received from the set of input devices 38, communications received by the communication device 40, the flight plan data 44, or a combination thereof, that a comparison of the initial climb trajectory 64 with the first altitude constraint 82 would not satisfy the first altitude constraint 82. Thus, the system 30 or controller module 32 would determine, estimate, predict, or otherwise select a deviation, or a point of deviation from the initial climb trajectory 64 (a "deviation point") in order to satisfy the first altitude constraint 82. In one non-limiting instance, the deviation point can be prior to reaching the respective altitude constraint 66, 68, 82. For example, the flight path during departure phase is based on maximum or minimum flight path angle until the altitude-distance constraint is satisfied. Then from constrained point, the flight path returns to the unconstrained optimal flight path by iterative optimization at each energy level. As used herein, "prior to reaching" the respective altitude constraint 66, 68, 82 can include prior to passing the horizontal distance where the constraint 66, 68, 82 is located, passing the altitude defined by the altitude constraint, or a combination thereof.

Once a deviation point is selected by the system 30 or the controller module 32 is configured to determine, calculate, verify, or otherwise validate that the updated claim trajectory 74, deviating from the initial climb trajectory 64 at the deviation point, satisfies the set of altitude constraints 66. The system 30 or controller module 32 can operably repeatedly calculate a set of subsequent models 76, subsequent to the deviation point, and starting from the deviation point, wherein the set of subsequent models 76 define performance characteristics of the aircraft 20 at the respective positions. The calculating of the set of subsequent models 76 can solve for determined, estimated, or predicted state variables or performance characteristics for the aircraft 20 at the respective model 76. In one non-limiting example, the state variables or performance characteristics for the aircraft 20 can include, but are not limited to: the airspeed, thrust control, altitude, change in trajectory, fuel reserves, fuel consumption (e.g. fuel burn rate), or the like. The system 30 determines, accumulates, or builds the updated climb profile 12 or the updated climb trajectory 74 based on the set of subsequent models 76, and compares, confirms, or validates the updated climb profile 12 satisfies the upcoming altitude constraint.

In another non-limiting example, the system 30 can also solve for the one or more aircraft 20 performance characteristics by first calculating a threshold value, such as an aircraft state threshold at each respective model 76. One example of an aircraft state threshold value that can be calculated at each respective model 76 can be an aircraft energy value, that is, the total or summation of an actual, an estimated, a predicted, or an arbitrary amount of potential and kinetic energy of the aircraft 20 at the respective model 76. In another example, by knowing or having previously calculated the preceding model 76, the subsequent calculating of a subsequent model 76 can be at least partially based on, for instance, an actual, an estimated, a predicted, or a determined set of performance characteristics of the immediately preceding model 76. With regards to the aircraft energy value, the calculating of the model 76 can be at least partially based on, for instance, an actual, an estimated, a predicted, or a determined altitude of the aircraft 20 at the respective model 76 (e.g. values that will be related to the potential energy of the aircraft 20), a flight path angle (e.g. an aircraft 20 pitch) at the respective model 76, a vertical airspeed at the respective model 76, or a determined airspeed or thrust control of the aircraft 20 at the respective model 76 (e.g. values that will be related to the kinetic energy of the aircraft 20). The subsequent calculating can further be based on additional state information of the aircraft 20 or environment, such as data received by the set of input devices 38 or communication device 40, and including but not limited to atmospheric information, flight path constraints, vehicle constraints, airport traffic, convective weather models, or the like.

In yet another example, the subsequent calculating for the set of models 76 can also be based on cost values or cost parameters defined by the cost profile database 50. For instance, the system 30 can solve for aircraft 20 performance characteristics, such as airspeed or variable thrust parameter controls, based on minimizing costs or values defined by the cost profile database 50 and specific each subsequent model 76. As used herein, "thrust parameter controls," "thrust parameter values," or the like, refer to settings, inputs, control system responses, or the like enable or configured to adjust a thrust or thrust output for an aircraft 20 or aircraft engine. In one non-limiting example, thrust parameter values can include engine control settings or parameters, fuel consumption settings or parameters, or the like. In another non-limiting example, thrust parameter values can include a combination of settings or parameters enabling or determining the thrust or thrust output.

In addition to calculating the set of subsequent models 76 based on the preceding models 76, the system 30 or the controller module 32 can be further configured to calculate subsequent models 76 based not only on satisfying the current altitude constraint (e.g. the first altitude constraint 82), but also another subsequent constraint such as a second altitude constraint 84, following the first altitude constraint 84. As shown, the second altitude constraint is a windowed altitude constraint 68 having a maximum altitude approximately matching the maximum altitude of the first altitude constraint 82. Aspects of the system 30 or the controller module 32 can further calculate the set of models 76 prior to the first altitude constraint 82, or between the first and second altitude constraints 84, based on the upcoming altitude constraints 66.

In this example, the system 30 or the controller module 32 can calculate, determine, or predict that subsequent models 76 may not include subsequently larger or higher aircraft energy levels when there is not expected increase in altitude due to an upcoming altitude constraint 84. In one non-limiting aspect, the system 30 can hold the altitude or potential energy of the aircraft 20 at a set value between the first and second altitude constraints 82, 84, and solve for the performance characteristics of the set of subsequent models 76. In another non-limiting example, the system 30 can determine or predict that the most effective updated climb profile 12 or climb trajectory 74 (e.g. most efficient, minimized cost, etc.) between the first and second altitude constraints 82, 84 can include holding the aircraft 20 at the maximum altitude satisfying the altitude constraints 82, 84 at a constant airspeed.

In another example, a subsequent altitude constraint 66, such as a third altitude constraint 86 can define a maximum altitude, followed by a fourth altitude constraint 88 defining a minimum altitude. In this example, the system 30 or the controller module will again need to deviate from the updated climb profile 12 or updated climb trajectory 74 in order to satisfy the fourth altitude constraint 88. Thus, similar with respect to the deviating from the initial climb profile 64, the system 30 can determine, calculate, or predict that the current climb profile 12 or current climb trajectory 74 will not satisfy the fourth altitude constraint 88, and can select, estimate, or predict a deviation point from which to deviate from the current climb profile 12.

The system 30 then proceeds to repeatedly calculate a set of subsequent models 76, starting with the deviation point. In this example, the system will determine the aircraft needs to climb higher to reach the fourth altitude constraint 88, so the system 30 can calculate, determine, or predict that subsequent models 76 include subsequently larger or higher aircraft energy levels due to the increase in altitude (e.g. increased potential energy) and do to a possible increase in airspeed (e.g. increased kinetic energy, for example due to increasing a thrust profile to climb). In one non-limiting example, the system 30 can set a value or limit for reaching a maximum trajectory angle while climbing, a maximum thrust setting, or a combination thereof, when solving for the aircraft 20 performance characteristics of the set of subsequent models 76. The system 30 or controller module 32 can then determine, accumulate, or build the updated climb profile 12 or the updated climb trajectory 74 based on the set of subsequent models 76, and compares, confirms, or validates the updated climb profile 12 satisfies the upcoming altitude constraint 88. The system 30 can further repeat this process in updating the climb profile 12 and the climb trajectory 74 to level off between the fourth altitude constraint 88 and an upcoming fifth altitude constraint 78.

The process of determining the current climb profile 12 does not satisfy an upcoming altitude constraint 66, selecting a deviation point, repeatedly calculating the set of subsequent models 76, and determining an updated climb profile to satisfy the upcoming altitude constraint 66 can continue and repeat for each upcoming and unsatisfied altitude constraint 66 until no further altitude constraints exists in the subsequent climb profile 12, or until the aircraft 20 reaches the cruising altitude 62 or cruise profile 14. In one non-limiting instance, the cruising altitude 62 can be defined as the final altitude constraint (e.g. a minimum altitude constraint 72).

For comparison, FIG. 3 illustrates an example conventional climb trajectory 90, shown in dotted line, demonstrating a climb profile generated by conventional systems. As shown, deviations from the set of altitude constraints 66 are slow, resulting in, for example, missing or not satisfying the fourth altitude constraint 88, and producing a less efficient overall conventional climb trajectory 90. The less efficient conventional climb trajectory 90 can have increased costs, as defined by the cost profile data 50, compared with aspects of the disclosure. In one non-limiting example, the updated climb trajectory 74 was able to reduce the amount of climb phase fuel burned by 1.3 percent. The view of FIG. 3 showing the conventional climb trajectory 90 compared with the updated climb trajectory 74 is merely illustrative of the difference between the trajectories 74, 90. Actual deviations between the respective trajectories 74, 90 can vary, and are not limiting as shown.

Figure 4:
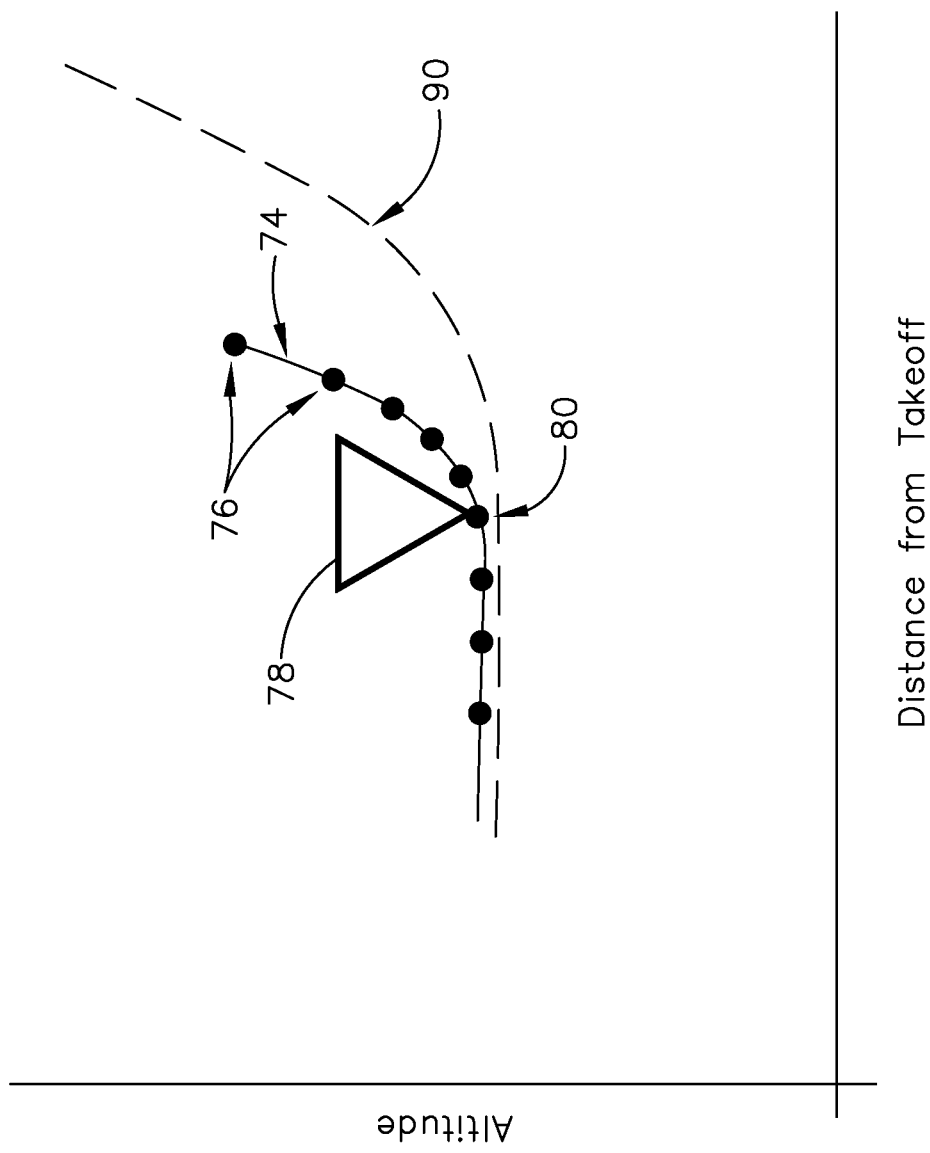
FIG. 4 illustrates a zoomed view of a portion of the climb profile of FIG. 3, in accordance with various aspects described herein.

FIG. 4 illustrates a zoomed portion of the updated climb trajectory 74 of FIG. 3. The illustration demonstrates that a deviation point 80 can be selected, estimated, or predicted prior to the passing of the upcoming altitude constraint 66, shown as the fifth altitude constraint 78. In this sense, the deviating from the climb trajectory 74 can utilize a steeper climb angle once passed the altitude constraint 78, allowing for a more rapid climb trajectory 74 response when passing the altitude constraint 78. Stated another way, by selecting and initiating a deviation at a deviation point 80 prior to the altitude constraint 78, the updated climb trajectory 74 and climb faster, or more aggressively after passing the maximum altitude constraint 78, compared with the conventional climb trajectory 90. In the example of a minimum altitude constraint 70, by selecting a deviation point 80 prior to the passing of the upcoming altitude constraint 70, the updated climb trajectory 74 can level out faster, more smoothly, or, for instance, with reduced costs, compared with the conventional climb trajectory 90.

Non-limiting aspects of the disclosure can further be included wherein the system 30 further determines or predicts whether the updated climb profile 12 or updated climb trajectory 74 satisfies the respective altitude constraint 66 or set of altitude constraints 66 within a tolerance threshold. In one example, the tolerance threshold can include a proximity threshold, for example defining that the updated climb profile 12 or updated climb trajectory 74 satisfies the respective altitude constraint 66 within a set horizontal distance (e.g. within 1 kilometer), or a horizontal distance range (e.g. between 1 kilometer and 2 kilometers) relative to the altitude constraint 66. In another example, the tolerance threshold or proximity threshold can define that the updated climb profile 12 or updated climb trajectory 74 satisfies the respective altitude constraint 66 within a set altitude value (e.g. within 50 meters), or an altitude range (e.g. between 10 and 50 meters) relative to the limits of the altitude constraint 66. In yet another example, the tolerance threshold can include an aircraft state threshold, as previous described, and can define that the updated climb profile 12 or updated climb trajectory 74 satisfies the respective altitude constraint 66 within another performance characteristic of the aircraft, or a combination of performance characteristics (e.g. climbing past a maximum altitude constraint 70 at maximum thrust or at a maximum trajectory, or leveling off the trajectory, or a minimum trajectory angle, within 100 horizontal meters and 10 meters of altitude of a minimum altitude constraint 72). In another non-limiting example, the tolerance threshold can include a range of acceptable values, for example, a plus or minus five percent tolerance. In the non-limiting example of the aircraft state thresholds, the tolerance threshold can include a tolerance value of plus or minus one angular degree.

The system 30 can further provide the determined or predicted climb profile 12 to another system by way of the set of output devices 46 or the communication device 40, such as an electronic flight bag, autoflight, autopilot, or autoland system, such that the aircraft 20 can be flow in accordance with the determined or predicted climb profile 12. In another non-limiting example, the system 30, or another system connected with the system 30, can generate, provide, or otherwise determine instructions for a pilot to follow in accordance with the determined or predicted climb profile 12.

Figure 5:
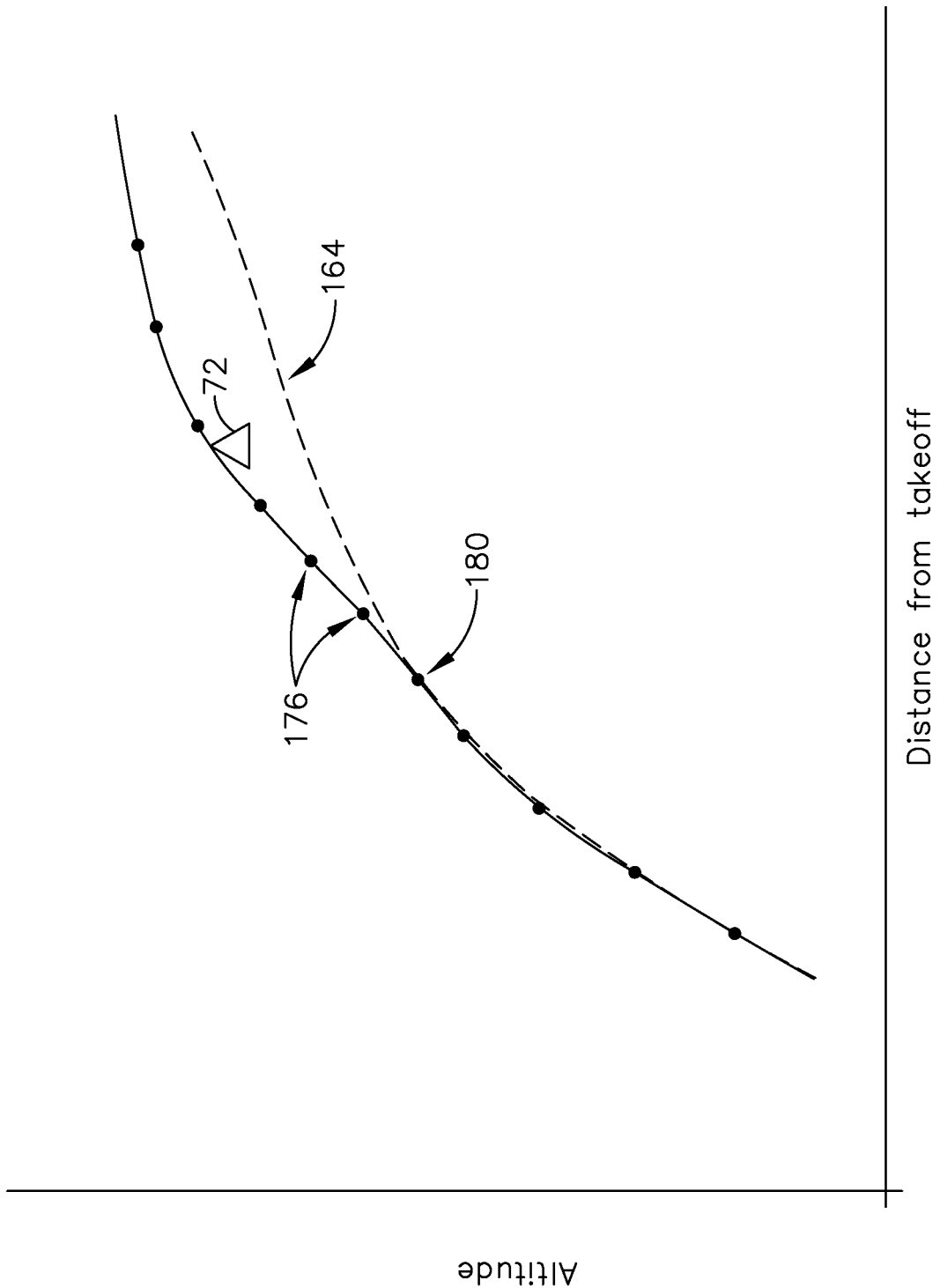
FIG. 5 illustrates another zoomed view of a portion of the climb profile, in accordance with various aspects described herein.

While the deviation point 80 of FIG. 4 is shown to occur at the fifth altitude constraint 78, non-limiting examples of deviations points 80 relative to one or more altitude constraints 66 can occur prior to, at, or after reaching the respective constraint 66. For instance, FIG. 5 illustrates another non-limiting example of the operation of the system 30. In this illustrated example, the aircraft 20 operating in accordance with a current climb profile 164 (shown in dotted line) that will not satisfy, or climb higher than, an upcoming minimum altitude constraint 72 can operably select a deviation point 180 prior to the upcoming minimum altitude constraint 72. In selecting the deviation point 180 prior to the upcoming altitude constraint 72, the system 30 can adjust or select an increased climb trajectory or set of models 176 (compared with the current climb profile 164), and determine or predict whether the updated climb profile or updated climb trajectory satisfies the minimum altitude constraint 72. In one example, if the updated climb profile still does not reach an altitude satisfying the minimum altitude constraint 72, the system 30 can select a new deviation point 180 even further from the upcoming altitude constraint 72 and recalculate.

Figure 6:
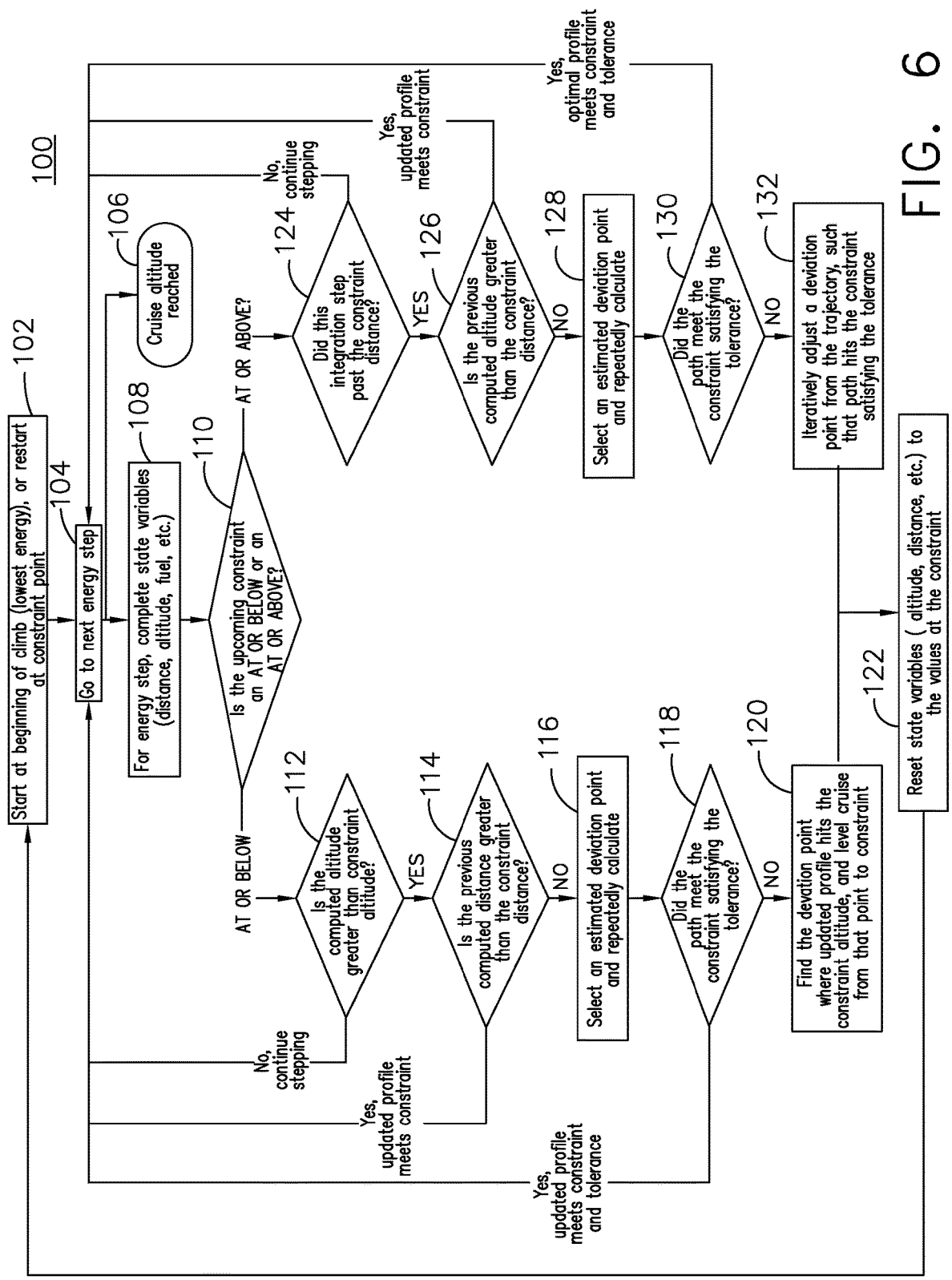
FIG. 6 illustrates a flow chart diagram demonstrating a method of determining the climb profile of FIG. 3, in accordance with various aspects described herein.

FIG. 6 illustrates a first flowchart demonstrating a method 100 of determining the climb profile 12, as described. The method 100 can start at the beginning of the climb (such as at takeoff from the airport), or the method 100 can restart based on an upcoming altitude constraint 66, at 102. The method 100 then proceeds to move the calculation step, for example based on an aircraft energy step, at 104. Then, for the current calculation of a climb profile model 76, determine the state variables for the aircraft at the current model 76, at 108. In one non-limiting example, step 108 can include determining the initial climb profile 64, as described herein. Next, the method 100 determines if the upcoming altitude constraint is an at-or-below altitude constraint (e.g. a maximum altitude constraint 70) or an at-or-above altitude constraint (e.g. a minimum altitude constraint 72), at 110. If the upcoming altitude constraint is a maximum altitude constraint 70, the method 100 proceeds to step 112.

At step 112, the method 100 determines if the altitude at the current model 76 (e.g. calculated in 108) is not greater than the maximum altitude constraint 70, the method 100 returns to step 104 and continues stepping to the subsequent climb profile model 76. If the method 100 determines if the altitude at the current model 76 is greater than the maximum altitude constraint 70 at 112, the method 100 continues to step 114. At step 114, the method 100 determines if previously computed distance (e.g. calculated in 108) is greater than the maximum altitude constraint 70 distance (e.g. no deviation or climb profile 12 response is needed yet), the current or updated method 100 currently meets the altitude constraint 70, and the method returns to step 104. If the method 100 determines if previously computed distance is not greater than the maximum altitude constraint 70 distance at 114, the method 100 continues to step 116. In step 116, the method 100 selects a deviation point 80 and repeatedly calculates the set of subsequent climb profile models 76 and determines the updated climb profile 12 based on the set of subsequent models 76, as described.

The method 100 then determines if the updated climb profile 12 meets the maximum altitude constraint 70 and also satisfying the threshold or tolerance threshold, as described, at 118. As previously described, the threshold or tolerance thresholds can include, but are not limited to, altitude thresholds, aircraft state thresholds, proximity thresholds, tolerance thresholds, or a combination thereof. If the updated climb profile 12 meets the maximum altitude constraint 70 and also satisfying the tolerance threshold, the method 100 returns to step 104. With the return to step 104, the method 100 can update or recalculate the aircraft energy levels based on updated information, updated data, or updated performance characteristics of the aircraft 20. For example, if the aircraft 20 does not expect to climb or has not climbed to a higher altitude (e.g. the aircraft 20 is at the maximum altitude constraint 70) since the previous energy step 104, the previous energy levels or performance characteristics calculated or determined in step 108 can be accurate. Alternatively, if for example, the aircraft 20 has increased airspeed due to increased thrust controls since the previous energy step 104, the previous energy levels or performance characteristics calculated or determined in step 108 can be accurate. In yet another example, altitude and speed values can be held constant for calculation or determination purposes.

Knowing the accurate or updated airspeed, altitude, trajectory, and the like, the method 100 can utilize parametric equations to solve for aspects such as the thrust controls and minimizing the cost of operating the aircraft 20 utilizing the cost profile data 50, in the repeated calculating step at 116. In one non-limiting example, the calculated performance characteristics or aircraft state values include an increased or increasing amount of aircraft energy values (e.g. by way of altitude climbing or airspeed change), new values can be determined. The amount of energy added can be a set value, an arbitrary value, or the like. In one example, the method 100 can add 50 Kilojoules of energy, such as specific energy (e.g. energy divided by mass) when stepping upward to the next model. In another example, the amount of energy added can correspond to an expected or predetermined altitude step, such as 500 feet of altitude between the prior model and the next model. The added aircraft energy can be divided between a faster airspeed of the aircraft 20 at the subsequent model 68 (compared with the preceding 68, e.g. added kinetic energy), a higher altitude of the aircraft 20 at the subsequent model 68 (compared with the preceding model 68, e.g. added potential energy), or a combination thereof.

Knowing the airspeed, altitude, trajectory, and the like, the method 100 can utilize parametric equations to solve for the thrust controls at the subsequent, minimizing the cost of operating the aircraft 20 while determining the climb profile 12. Next the method 100 can step upward to the next model, for example, and add an amount of energy to the total aircraft energy levels, and continue to repeatedly calculate the subsequent set of models 68 and corresponding performance characteristics until meeting or reaching the altitude constraint 70. Alternatively, the change in aircraft energy levels can occur, as described, during the repeated calculating in step 116.

If the updated climb profile 12 does not meet the maximum altitude constraint 70 or does not satisfying the tolerance threshold at 118, the method 100 proceeds to find or select a new deviation point 80 where the updated climb profile 12 meets the maximum altitude constraint 70, and for instance, levels the aircraft trajectory from that deviation point onward until reaching the maximum altitude constraint 70, and 120. Then the method 100 the resets the state variable to the values at the maximum altitude constraint 70 at 122, and returns to the start of the method at 102.

If the upcoming altitude constraint is a minimum altitude constraint 72 in step 110, the method 100 proceeds to step 124. In step 124, the method 100 determines if the current climb profile model 76 passes the minimum altitude constraint 72 distance (e.g. is the aircraft 20 horizontally beyond the minimum altitude constraint 72). If the aircraft 20 is not horizontally beyond the minimum altitude constraint 72, the method 100 returns to step 104. If the aircraft 20 is horizontally beyond the minimum altitude constraint 72, the method 100 continues to determine if the current climb profile model 76 altitude is greater than the minimum altitude constraint 72, at 126. If the current climb profile model 76 altitude is greater than the minimum altitude constraint 72, then the method 100 returns to step 104. If the current climb profile model 76 altitude is not greater than the minimum altitude constraint 72, the method 100 selects a deviation point 80 and repeatedly calculates the set of subsequent climb profile models 76 and determines the updated climb profile 12 based on the set of subsequent models 76, as described.

Next the method 100 determines if the updated climb profile 12 meets the minimum altitude constraint 72 and satisfies the tolerance threshold, at 130. If the updated climb profile 12 meets the minimum altitude constraint 72 and satisfies the tolerance threshold, the method 100 returns to step 104. If the updated climb profile 12 does not meet the minimum altitude constraint 72 and satisfies the tolerance threshold, the method continues to iteratively adjust the deviation point 80 from the current climb profile trajectory 74, such that a newly calculated updated climb profile 12 will meet the minimum altitude constraint 72 and satisfy the tolerance, at 132. In one non-limiting example, the updated climb profile 12 can include climbing at a maximum flight path angle (e.g. by meeting, exceeding, or satisfying a tolerance threshold related to the flight path angle). Then the method 100 resets the state variable to the values at the maximum altitude constraint 70 at 122, and returns to the start of the method at 102.

As described above, with the return to step 104, the method 100 can update or recalculate the aircraft energy levels based on updated information, updated data, or updated performance characteristics of the aircraft 20. For example, if the aircraft 20 has climbed or expects to climb to a higher altitude at the next energy step of 104, or has increased thrust or airspeed since the previous energy step 104, the previous energy levels or performance characteristics calculated or determined in step 108 can be inaccurate.

Knowing the accurate or updated airspeed, altitude, trajectory, and the like, the method 100 can utilize parametric equations to solve for aspects such as the thrust controls and minimizing the cost of operating the aircraft 20 utilizing the cost profile data 50, in the repeated calculating step at 128. In one non-limiting example, if the aircraft 20 is climbing or expects to climb, or increase airspeed, the method can go to the next energy step in 104, and calculate performance characteristics or aircraft state values using an increased amount of aircraft energy values. The amount of energy added can be a set value, an arbitrary value, or the like. In one example, the method 100 can add 50 Kilojoules of energy, such as specific energy (e.g. energy divided by mass) when stepping upward to the next model. In another example, the amount of energy added can correspond to an expected or predetermined altitude step, such as 500 feet of altitude between the prior model and the next model. The added aircraft energy can be divided between a faster airspeed of the aircraft 20 at the subsequent model 68 (compared with the preceding 68, e.g. added kinetic energy), a higher altitude of the aircraft 20 at the subsequent model 68 (compared with the preceding model 68, e.g. added potential energy), or a combination thereof. Knowing the airspeed, altitude, trajectory, and the like, the method 100 can utilize parametric equations to solve for the thrust controls at the subsequent, minimizing the cost of operating the aircraft 20 while determining the climb profile 12. Next the method 100 can step upward to the next model, for example, and add an amount of energy to the total aircraft energy levels, and continue to repeatedly calculate the subsequent set of models 68 and corresponding performance characteristics until meeting or reaching the altitude constraint 70. Alternatively, the change in aircraft energy levels can occur, as described, during the repeated calculating in step 128.

While FIG. 6 is described as illustrating the determining the climb profile 12, non-limiting aspects of the discloser can be included wherein the method 100 and description of FIG. 6 is applied to a method of predicting the descent profile 12, as described.

Figure 7:
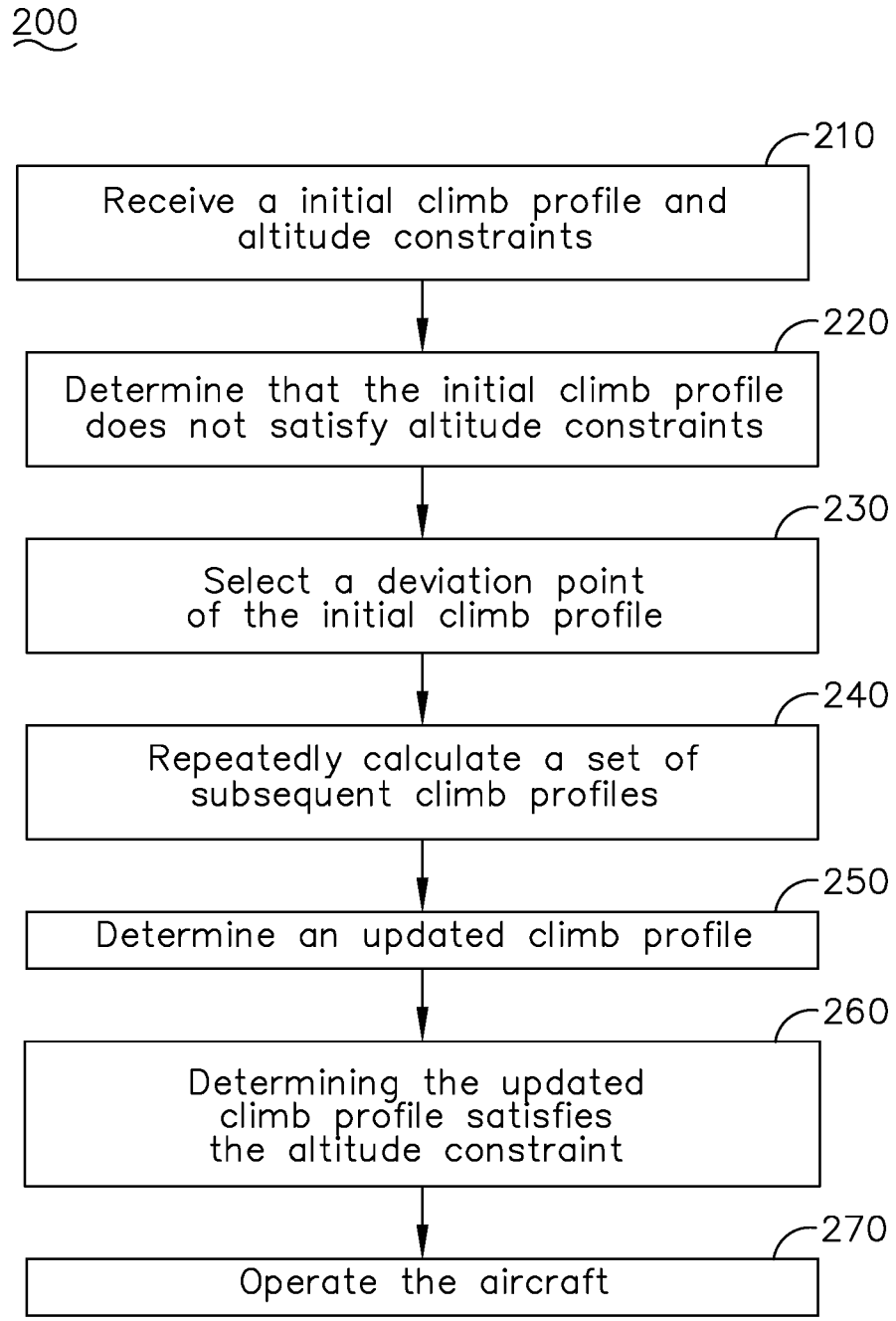
FIG. 7 illustrates another flow chart diagram demonstrating a method of determining the climb profile of FIG. 3, in accordance with various aspects described herein.

FIG. 7 illustrates a second flowchart demonstrating another method 200 of determining the climb profile 12, as described. The method 200 starts by receiving, by the controller module 32, an initial climb trajectory 64 or climb profile (or a previously determined climb trajectory 74 or climb profile 12) defining a portion of a flight plan 10 for the aircraft 20 between takeoff and a cruise profile 14, and an altitude climb constraint 66 defining at least one altitude limitation of the aircraft 20, at 210. The method 200 then determines, by the controller module 32, that the initial climb trajectory 64 or climb profile does not satisfy the altitude constraint 66, at 220. The method 200 continues to select, by the controller module 32, a deviation point 80 of the initial climb trajectory 64 or climb profile prior to the altitude constraint, at 230.

Next the method 200 repeatedly calculates, by the controller module 32, a set of subsequent climb profile models 76 starting from the deviation point 80, for example, based on successive aircraft energy levels, at 240. The method 200 then determines an updated climb profile 12 or updated climb trajectory 74 based on the set of subsequent climb profiles 76, at 250. The method 200 continues to determine whether the updated climb profile 12 satisfies the altitude constraint 66 at 260, and if so, operates the aircraft in accordance with the updated climb profile 12 or updated climb trajectory 74.

While FIG. 7 is described as illustrating the determining the climb profile 12, non-limiting aspects of the discloser can be included wherein the method 200 and description of FIG. 7 is applied to a method of predicting the climb profile 12, as described.

The sequences depicted in methods 100 and 200 are for illustrative purposes only and is not meant to limit the methods 100, 200 in any way as it is understood that the portions of the method can proceed in a different logical order, additional or intervening portions can be included, or described portions of the method can be divided into multiple portions, or described portions of the method can be omitted without detracting from the described method. Many other possible aspects and configurations in addition to that shown in the above figures are contemplated by the present disclosure. For instance, while aspects of the disclosure are described relative to a climb from takeoff, the disclosure can be applicable to any climb in altitude subject to constraints from a first altitude to a second altitude, higher than the first altitude.

The aspects disclosed herein provide method and system for determining or predicting a climb profile. The method can include, but not limited to, flying according to unconstrained climb profile (also called singular arc profile), and departing from singular arc by maximum or minimum flight path angle to satisfy an altitude-distance constraint that would be otherwise violated (e.g. no satisfied) by the unconstraint optimal climb profile (singular arc). Once the method statisfies the altitude-distance constraint, the method can resume optimizing the climb Hamiltonian cost function to return to the singular arc. It repeats the same process for all the altitude-distance constrains that are not met by the climb profile until it reaches to cruise altitude.

The technical effect is that the above described aspects enable the determining, predicting, or otherwise generation of a climb profile to be flown by an aircraft. One advantage that can be realized in the above aspects is that the above described aspects reduce flight operation costs during the climb phase of the aircraft. Aircraft departure procedures are typically constrained by the set of altitude constraints to separate and monitor air traffic at or about a departure location. The set of altitude constraints can result in higher costs or larger or higher amounts of fuel burned, compared with an unconstrained climb profile. Aspects of the disclosure can increase the efficiency or reduce the costs of the aircraft climb profile while meeting or satisfying the set of constraints. The costs can be measured in time, scheduling, fuel consumption, or other aspects captured by the cost profile data.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining a climb profile for an aircraft, the method comprising:
   receiving, by a controller module, an initial climb profile defining a portion of a flight plan for the aircraft between takeoff and a cruise profile, and an altitude climb constraint defining at least one altitude limitation of the aircraft;
   determining, by the controller module, that the initial climb profile does not satisfy the altitude climb constraint;
   selecting, by the controller module, a deviation point of the initial climb profile prior to the altitude climb constraint;
   repeatedly calculating, by the controller module, a set of subsequent climb models, wherein each subsequent climb model of the set of subsequent climb models starts from the deviation point and is based on successive aircraft energy levels, wherein the set of subsequent models define different performance characteristics of the aircraft;
   determining an updated climb profile based on the set of subsequent climb models;
   determining the updated climb profile satisfies the altitude climb constraint; and
   operating the aircraft in accordance with the updated climb profile.

2. The method of claim 1 wherein the altitude climb constraint further includes a location dimension, and wherein determining the updated climb profile satisfies the altitude climb constraint further comprises determining when the updated climb profile satisfies the altitude climb constraint within a tolerance threshold.

3. The method of claim 2 wherein the altitude climb constraint is a minimum altitude climb constraint and wherein the tolerance threshold is a minimal trajectory angle relative to horizon when passing the location dimension of the altitude climb constraint.

4. The method of claim 2 wherein the altitude climb constraint is a maximum altitude climb constraint, and wherein the tolerance threshold is a maximum trajectory angle relative to horizon, when passing the location dimension of the altitude climb constraint.

5. The method of claim 4 wherein the repeatedly calculating the set of subsequent climb models is further based on successive aircraft energy levels with a thrust setting at maximum thrust.

6. The method of claim 2, further comprising, upon determining the updated climb profile does not satisfy the altitude climb constraint, selecting a different deviation point of the initial climb profile.

7. The method of claim 1 wherein repeatedly calculating the set of subsequent climb models includes calculating at least a subset of: altitude, speed, time, distance traveled, airspeed, or aircraft weight at each subsequent climb model.

8. The method of claim 1, further comprising upon determining the updated climb profile satisfies the altitude climb constraint, further determining that the updated climb profile does not satisfy a subsequent altitude climb constraint in a set of altitude climb constraints, and repeating the selecting, the calculating, and the determining until the updated climb profile satisfies the set of altitude climb constraints.

9. The method of claim 8 wherein the last of the set of altitude climb constraints is a cruising altitude.

10. The method of claim 1 wherein each repeated calculating determines a variable thrust parameter value of the respective climb model based on a minimizing cost profile.

11. The method of claim 10 wherein the minimizing cost profile is based on minimizing fuel consumption at each successive climb model.

12. The method of claim 1 wherein selecting the deviation point of the initial climb profile further includes selecting the deviation point as close to the altitude climb constraint as possible while still determining an updated climb profile that satisfies the altitude climb constraint.

13. The method of claim 1 wherein determining the updated climb profile satisfies the altitude constraint further comprises satisfying the altitude constraint within a predetermined horizontal distance.

14. The method of claim 13 wherein the predetermined horizontal distance is within 1 kilometer of the altitude constraint.

15. A system for determining a climb profile, the system comprising:
memory storing an initial climb profile defining a portion of a flight plan between takeoff and a cruise phase, and an altitude climb constraint defining at least one altitude limitation of the aircraft; and
a controller module configured to receive the initial climb profile and the altitude climb constraint, to determine that the initial climb profile does not satisfy the altitude climb constraint, to select a deviation point of the initial climb profile prior to the altitude climb constraint, to repeatedly calculate a set of subsequent climb models wherein each subsequent climb model of the set of subsequent climb models starts from the deviation point and is based on successive aircraft energy levels, to determine an updated climb profile based on the set of subsequent climb models, wherein the set of subsequent models define different performance characteristics of the aircraft, to determine the updated climb profile satisfies the altitude climb constraint, and to operate the aircraft in accordance with the updated climb profile.

16. The system of claim 15 wherein the altitude climb constraint further includes a location dimension, and wherein the controller module is further configured to determine that the updated climb profile satisfies the altitude climb constraint within a tolerance threshold.

17. The system of claim 16 wherein the altitude climb constraint is a minimum altitude climb constraint and wherein the tolerance threshold is a minimal trajectory angle relative to horizon when passing the location dimension of the altitude climb constraint.

18. A method of predicting a climb profile for an aircraft, the method comprising:
receiving, by a controller module, an initial climb profile defining a portion of a flight plan for the aircraft between a first altitude and a second altitude, and an altitude climb constraint defining at least one altitude limitation of the aircraft;
predicting, by the controller module, that the initial climb profile does not satisfy the altitude climb constraint;
selecting, by the controller module, a deviation point of the initial climb profile prior to the altitude climb constraint;
repeatedly calculating, by the controller module, a set of subsequent climb models wherein each subsequent climb model of the set of subsequent climb models starts from the deviation point and is based on successive aircraft energy levels, wherein the set of subsequent models define different performance characteristics of the aircraft;
determining an updated climb profile based on the set of subsequent climb models;
determining the updated climb profile satisfies the altitude climb constraint; and
operating the aircraft in accordance with the updated climb profile.

19. The method of claim 18 wherein the altitude climb constraint further includes a location dimension, and wherein determining the updated climb profile satisfies the altitude climb constraint further comprises determining when the updated climb profile satisfies the altitude climb constraint within a tolerance threshold.

20. The method of claim 19 wherein the altitude climb constraint is a maximum altitude climb constraint, and wherein the tolerance threshold is a maximum trajectory angle relative to horizon, when passing the location dimension of the altitude climb constraint.

* * * * *